VARACTOR PHASE MODULATOR CIRCUITS HAVING A PLURALITY OF SECTIONS FOR PRODUCING LARGE PHASE SHIFTS
Filed April 14, 1964

Inventor
Charles N. Lynk Jr.
Mueller + Aichele
Attys.

United States Patent Office 3,328,727

Patented June 27, 1967

3,328,727

VARACTOR PHASE MODULATOR CIRCUITS HAVING A PLURALITY OF SECTIONS FOR PRODUCING LARGE PHASE SHIFTS

Charles N. Lynk, Jr., Chicago, Ill., assignor to Motorola, Inc., Franklin Park, Ill., a corporation of Illinois Filed Apr. 14, 1964, Ser. No. 359,602
2 Claims. (Cl. 332—30)

This invention relates generally to phase modulator circuits, and more particularly to a phase modulator circuit including varactor devices wherein a large angular phase variation is produced with low distortion.

Phase modulators are used in various applications such as to produce a frequency modulated carrier wave for transmission by radio. Phase modulators including vacuum tubes have been used for many years but these circuits provide a maximum phase shift to about 80°, with 10 percent distortion before de-emphasis. Transistor phase modulators have also been used but these circuits are critical to align and have provided only about 70° phase shift, with 10 percent distortion before de-emphasis. Modulators of these types both require energy for operation, and the vacuum tube modulators have the disadvantage that replacement of the tubes may be required.

In order to reduce the number of times multiplication of the modulated oscillations in a frequency modulation transmitter, and thereby simplify the transmitter structure, it is desired that the phase modulator initially produce a large angular phase shift. Also, in many cases the desired output frequency is only a few times greater than that of the sources of oscillations utilized, so that the phase variation can be multiplied only a small number of times without using a complex system. This is particularly true of transmitters having crystal controlled oscillators which produce relatively high frequencies.

It is, therefore, an object of the present invention to provide a phase modulator circuit which applies a large angular phase shift to a carrier wave with low distortion (good linearity).

Another object of the invention is to provide a phase modulator for use in a frequency modulation transmitter which is of simple construction and is easy to align.

A further object of the invention is to provide a phase modulator having only passive elements and which operates at low modulation drive levels and is relatively insensitive to the level of applied oscillations.

A feature of the invention is the provision a phase modulator circuit including a plurality of tuned sections each having a coil and a varactor, with oscillations being applied to one section and the sections coupled to transfer energy from one to the other, and an audio modulation voltage being applied to the varactors for changing the tuning of the sections so that the sections shift the phase of the applied oscillations.

Another feature of the invention is the provision of a varactor phase modulator including a double tuned circuit with each section including a coil across which a varactor and an isolating capacitor are connected in series, and with coupling between the two sections approaching critical coupling so that the phase shift produced by the sections is accentuated. The coupling may be provided by a fixed or a variable coupling capacitor, or by a variable inductor coupling the two sections.

Another feature of the invention is the provision of a varactor phase modulator including three or more tuned circuit sections each including a coil with a varactor and an isolating capacitor connected in series thereacross, and with coupling capacitors between the sections providing sufficient coupling so that the phase shift produced by the entire circuit is greater than the sum of the phase shifts of the individual sections. The coupling is less than that providing maximum transfer of energy, and the ratio of the coupling capacity to the capacity of the individual sections decreases as the number of sections increases.

The invention is illustrated in the drawings wherein.

In practicing the invention, a varactor phase modulator circuit is provided including a plurality of tuned circuit sections which are coupled for transfer of energy therebetween. Each section includes an inductor, which may be a coil of a transformer, and a varactor which may be connected to an isolating capacitor. The modulating voltage is applied simultaneously across the varactors of the sections, so that the tuning of all sections is changed at the same time to cause a change in the phase of the oscillations applied thereto. The coupling of the sections is selected to be somewhat less than critical coupling so that the phase shifts produced by the two sections is accentuated by the coupling to provide maximum overall phase shift with minimum distortion.

In one form of the invention, the varactor circuit includes two tuned circuits each including a transformer, with oscillations being applied to the transformer of the first circuit and the modulated oscillations derived from the transformer of the second circuit. The two circuits are coupled by a capacitor which provides slightly less than critical coupling between the two circuits. In another embodiment, the two circiuts are coupled by a coil having a movable core to permit adjustment of the coupling.

In a third embodiment, three tuned circuit sections are provided, with the sections being coupled to each other by capacitors which are selected so that maximum phase variation is obtained with minimum distortion. Circuits with more than three tuned circuit sections may also be used when it is necessary to provide greater phase shift. As the number of sections is increased, the ratio of the coupling capacity to the effective capacity of each tuned circuit must be reduced to hold the distortion to a minimum.

Figure 1:
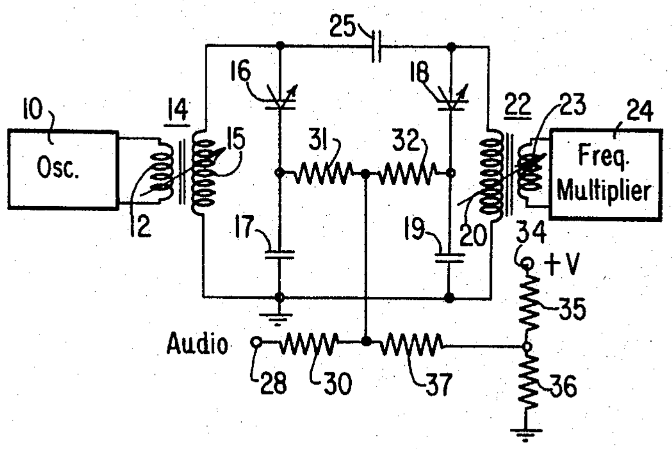
FIG. 1 illustrates a varactor phase modulator in accordance with the invention having two sections with capacity coupling therebetween.

Referring now to the drawings in FIG. 1 the invention is illustrated as a double tuned, capacity coupled circuit. A fixed frequency wave from oscillator 10 is applied to the primary winding 12 of transformer 14 which has a movable core for inductance adjustment. Connected in series across the secondary winding 15 of transformer 14, are varactor 16 and direct current isolating capacitor 17. The second tuned circuit is formed by varactor 18 connected in series with isolating capacitor 19 across the primary winding 20 of transformer 22. The secondary winding 23 of transformer 22 may be connected to a frequency multiplier or amplifier stage 24. The two tuned circuit sections are coupled by capacitor 25. Modulating potentials are applied from an audio source connected to terminal 28 through resistors 30, 31 and 32 to the varactors 16 and 18. A fixed bias is provided from the intermediate tap on the voltage divider formed by resistors 35 and 36 connected to terminal 34, and applied through resistor 37 and resistors 31 and 32 to the varactors. Resistors 31 and 32 provide decoupling of the two sections, and resistor 31 and isolating capacitor 17 may have values selected to provide integration of the audio signals applied to varactor 16. Similarly resistor 32 and isolation capacitor 19 may provide integration action for the audio signals applied to varactor 18.

The fixed bias provided from terminal 34 to the varactors 16 and 18 will establish a mean or center capacity value for the varactors. As the audio signal applied at terminal 28 swings positive and negative, the voltage applied to varactors 16 and 18 will increase and decrease to change the tuning of the two tuned sections. The two sections can be initially aligned by adjustment of the cores of transformers 14 and 22 so that the sections are tuned to the frequency applied by oscillator 10. As the tuning of the circuits varies from the frequency of the oscillations applied thereto, the tuned circuits will each produce a phase shift of the oscillations in a well known manner.

The amount of phase shift produced by each tuned circuit will depend upon the variation of the capacitive reactance of the varactor thereof, and for good linearity the maximum phase shift attainable by each circuit is of the order of plus or minus 24 degrees. It has been found, however, that by selecting the value of capacitor 25 to provide coupling between the two sections which approaches critical coupling, phase shifts can be obtained up to plus or minus 90° with less than 10 percent distortion before de-emphasis. This phase shift is substantially greater than the arithmetic sum of the phase shifts produced by the two tuned circuit sections.

Figure 2:
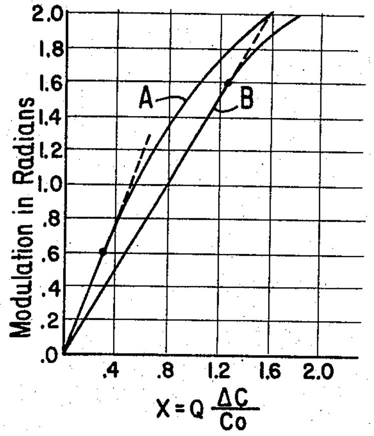
FIG. 2 is a chart with curves illustrating the operation of the circuit of FIG. 1.

This is illustrated by FIG. 2 which shows the phase shift produced against variation of the capacity of the varactors. This is proportional to the modulating voltage for voltage values which are relatively small and within the range used in the system. Curve A shows the phase shift attainable by variation of the capacity of the varactors when the coupling is such that the effect of the tuned circuits is the arithmetic sum of the phase shift of the two circuits individually. This is shown as .6 radian or about 34°. Curve B shows the variation in frequency when the coupling of the two circuits approaches critical coupling, and this is 1.6 radians or more than 90°, a much larger phase shift than that shown by curve A.

In a circuit which has been found satisfactory for providing phase modulation of oscillations having a frequency on the order of 15 megacycles, the following values were used. It is pointed out that these values are only illustrative and are not to be considered as limiting the values which may be used.

| | | |
|---|---|---|
| Varactor **16**, mean value | mmf | 40 |
| Capacitor **17** | mmf | 2500 |
| Varactor **18**, mean value | mmf | 40 |
| Capacitor **19** | mmf | 2500 |
| Resistor **30** | kilohms | 150 |
| Resistor **31** | do | 2.2 |
| Resistor **32** | do | 2.2 |
| Capacitor **25** | mmf | 1.2 |
| Terminal **34**, voltage | volts | 9 |
| Resistor **35** | kilohms | 270 |
| Resistor **36** | do | 270 |
| Resistor **37** | do | 150 |

Figure 3:
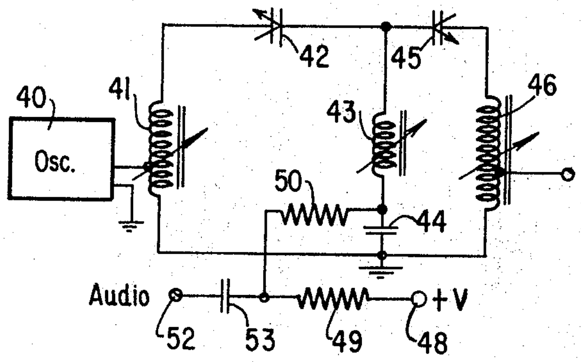
FIG. 3 is a diagram of a varactor phase modulator circuit in accordance with the invention having inductance coupling between the sections.

In FIG. 3 a modification of the circuit shown in FIG. 1 is illustrated. Signals from oscillator 40 are applied to a tap on inductor 41, which is tunable by a movable core. Connected across inductor 41 is varactor 42, coupling inductor 43 and isolating capacitor 44. The second section of the circuit includes varactor 45 connected in series with coupling inductor 43 and isolating capacitor 44 across coil 46. The output may be derived from a tap on coil 46. Fixed bias is applied from terminal 48 through resistors 49 and 50 and coupling inductor 43 to the varactors 42 and 45. Audio modulating signals are applied from terminal 52 through capacitor 53 and resistor 50, and through coupling inductor 43, to the varactors 42 and 45.

The circuit of FIG. 3 operates in generally the same way as the circuit of FIG. 1. This circuit has the advantage that the coupling inductor 43 can be easily adjusted to change the coupling to provide maximum phase shift with the desired degree of linearity. The coupling inductor 43 is however, substantially more expensive than the coupling capacitor 25 which may be a very small inexpensive component. In circuits wherein it is unnecessary to adjust the coupling, the circuit of FIG. 1 has a cost advantage as compared to the circuit of FIG. 3.

Figure 4:
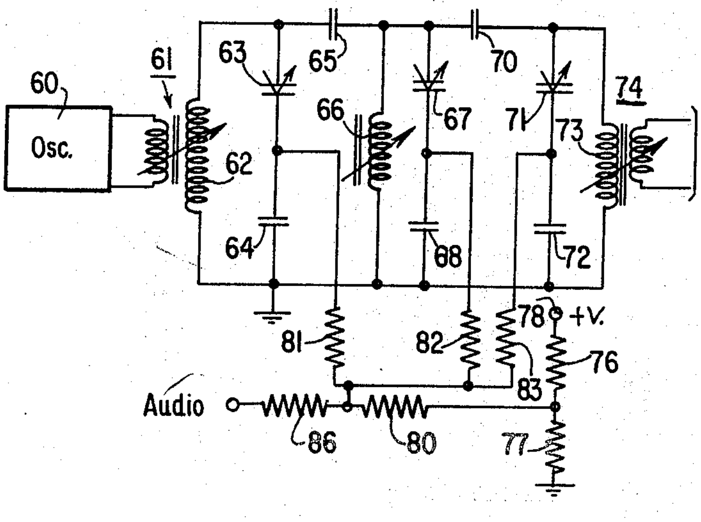
FIG. 4 shows a varactor phase modulator circuit of the invention including three tuned sections.

In FIG. 4 another variation of the circuit of FIG. 1 is illustrated. In this circuit, three tuned sections are provided for increasing the phase shift obtained. It will be apparent that a greater number of sections than three may be used, and circuits with four sections have been found to operate satisfactorily.

In FIG. 4 oscillations are applied from oscillator 60 through transformer 61 to the first tuned section, which includes the coil 62 of transformer 61 across which varactor 63 and isolating capacitor 64 are connected. The first section is coupled by capacitor 65 to a second section including coil 66, varactor 67 and isolating capacitor 68. The second section is coupled through capacitor 70 to a third section including varactor 71, isolating capacitor 72 and primary winding 73 of transformer 74. The modulated oscillations may be derived from the secondary winding of transformer 74.

Fixed bias is provided to the varactors 63, 67 and 71 by the voltage divider including resistors 76 and 77 connected to terminal 78 providing a positive potential. An intermediate potential derived from the voltage divider is applied through resistor 80 and decoupling resistors 81, 82 and 83 to the three varactors 63, 67 and 71. Audio modulating potentials are applied through resistors 86 and the decoupling resistors 81, 82 and 83 to the varactors of the three sections.

The circuit of FIG. 4 operates in the same manner as the circuit of FIG. 1, with each of the three circuits being initially tuned to the frequency of the applied oscillations by adjusting cores provided in the coils 62, 66 and 73 The capacitive reactance of the variators 63, 67 and 71 are changed by the modulating potentials applied thereto to tune the three circuits in accordance with the audio modulating signals so that each circuit applies a phase shift to the applied oscillations. The coupling of the sections accentuates the phase shift so that the total phase shift of the circuit is greater than the arithmetic sum of the phase shifts produced by the three circuit sections.

Figure 5:
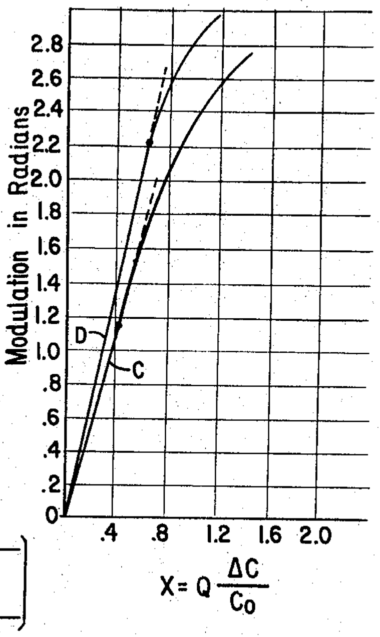
FIG. 5 is a chart with curves illustrating the operation of the circuit of FIG. 4.

In FIG. 5, the characteristics of the circuit of FIG. 4 are shown. Curve C shows the phase modulation produced when the circuits are decoupled so that each operates independently. The modulation limit for 10 percent distortion before de-emphasis is less than 1.2 radians or about 68°. Curve D shows the modulation when the coupling produces optimum phase modulation and the maximum is raised to more than 2.2 radians or about 130°.

It has been found that to provide good linearity with the circuit of FIG. 4, the coupling of the sections must be reduced as compared to that used when only two sections are provided. The ratio of the coupling capacity between the sections to the effective capacity of each section must be reduced as the number of sections is increased. However, the added phase shift produced by the additional sections increases the overall phase variation so that a greater phase variation is provided by the use of three sections than by the use of two sections. Similarly a greater phase shift may be provided by four sections than by three sections, although again the coupling must be reduced.

The multiple tuned varactor phase modulator circuits of the invention have been found to provide large angular phase variations with good linearity. As stated above, the double tuned circuits have provided phase shifts of plus or minus 90° with distortion less than 10 percent. Circuits with three sections having been found to provide phase shifts of plus or minus 130° with acceptable distortion. The modulator circuits are very simple and inexpensive, particularly when fixed coupling capacitors are used between sections.

The modulator circuits of the invention have the advantage that they respond to low level modulation signals so that the audio amplification required is minimized. Also that phase shift characteristics are not substantially affected by the level of the applied oscilations. No energizing potential is required as the circuit include no tubes or transistors which consume power. The varactors operate from a low bias potential, so that the power supply requirements of the modulator are a minimum.

I claim:

1. A phase modulator circuit including in combination, a plurality of tuned circuit means each including a coil having first and second terminals, a varactor having a first terminal connected to said first terminal of said coil and a second terminal, and an isolating capacitor having a first terminal connected to said second terminal of said varactor and a second terminal connected to said second terminal of said coil, each of said tuned circuit means independently forming a tuned circuit, means for applying oscillations to said coil of one of said tuned circuit means, capacitive reactance means coupling the junction between said first terminal of said varactor and said first terminal of said coil of each of said tuned circuit means to the junction between said first terminal of said varactor and said first terminal of said coil of another of said tuned circuit means for transferring energy from said one tuned circuit means to said other tuned circuit means, means coupled to said first terminal of each of said isolating capacitors of said tuned circuit means for applying bias potentials and modulating potentials thereacross to change the voltages applied to said varactors and the capacitances thereof to thereby change the tuning of all said tuned circuit means, so that the phase of the oscillations transferred through said tuned circuit means is varied by the tuning of all said tuned circuit means, said capacitive reactance means providing coupling between said adjacent tuned circuit means so that the phase variations are added and having a fixed value less than critical coupling for accentuating the added phase variations, and means for deriving modulated oscillations from said coil of the final one of said tuned circuit means.

2. A phase modulator circuit including in combination, first, second and third tuned circuit means each including a coil, a varactor and a capacitor connected in a closed series loop and each forming a tuned circuit independently of the others, means for applying fixed frequency oscillations to said first tuned circuit means, first capacitive reactance means coupling said first tuned circuit means to said second tuned circuit means for transferring energy from said first tuned circuit means to said second tuned circuit means, second capacitive reactance means coupling said second tuned circuit means to said third tuned circuit means for transferring energy from said second tuned circuit means to said third tuned circuit means, means coupled to said common connection of said capacitor and said varactor of said first, second and third tuned circuit means for applying bias potentials and modulating potentials thereacross to change the voltages applied to said varactors and the capacitive reactances thereof thereby change the tuning of said first, second and third tuned circuit means, so that the phase of the oscillations applied to said first tuned circuit means is varied by the tuning of said first, second and third tuned circuit means, said capacitive reactance means each having a fixed value to provide coupling between said tuned circuit means less than critical coupling so that said phase variations in said first, second and third tuned circuit means are added and are accentuated by said capactive reactance means, and means for deriving modulated oscillations from said coil of said third tuned circuit means.

References Cited

UNITED STATES PATENTS

| | | | |
|---|---|---|---|
| 2,555,959 | 6/1951 | Curtis | 332—30 |
| 3,023,378 | 2/1962 | Fuller. | |
| 3,110,004 | 11/1963 | Pope. | |
| 3,196,368 | 7/1965 | Potter | 332—30 |
| 3,267,393 | 8/1966 | Brossard et al. | 332—30 |

ROY LAKE, *Primary Examiner.*

ALFRED L. BRODY, *Examiner.*